US009292379B2

(12) United States Patent  
Grimsrud et al.

(10) Patent No.: US 9,292,379 B2  
(45) Date of Patent: Mar. 22, 2016

(54) APPARATUS AND METHOD TO MANAGE HIGH CAPACITY STORAGE DEVICES

(71) Applicant: Intel Corporation, Santa Clara, CA (US)

(72) Inventors: Knut Grimsrud, Forest Grove, OR (US); Jawad Khan, Cornelius, OR (US); Richard Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 14/040,651

(22) Filed: Sep. 28, 2013

(65) Prior Publication Data

US 2015/0095737 A1 Apr. 2, 2015

(51) Int. Cl.  
*H03M 13/00* (2006.01)  
*G06F 11/10* (2006.01)

(52) U.S. Cl.  
CPC .................. *G06F 11/1004* (2013.01)

(58) Field of Classification Search  
CPC .............. G06F 11/1004; G06F 11/221; G06F 12/0246; G06F 12/0866; G06F 2212/1036; G06F 2212/214; G06F 2212/7203; G06F 2212/7207; G06F 12/0873; G06F 3/0616; G11C 7/10; G11C 16/10; G11C 16/0483; G11C 11/5628; G11C 29/028; G11C 2029/0411; G11C 29/022; G11C 2216/30; G11C 13/0004; G11C 16/102; G11C 19/0808; G11C 2211/5641; H03M 13/09; H03M 13/096; H03M 13/098  
See application file for complete search history.

(56) References Cited

U.S. PATENT DOCUMENTS

| | | | | |
|---|---|---|---|---|
| 5,383,204 A | * | 1/1995 | Gibbs et al. ............... | 714/758 |
| 6,467,060 B1 | * | 10/2002 | Malakapalli et al. ......... | 714/758 |
| 8,032,674 B2 | * | 10/2011 | Nguyen et al. .................. | 710/53 |
| 2006/0098320 A1 | * | 5/2006 | Koga et al. .................. | 360/53 |
| 2007/0214308 A1 | * | 9/2007 | Pope et al. .................... | 711/100 |
| 2008/0148004 A1 | | 6/2008 | Iren et al. | |
| 2008/0222500 A1 | * | 9/2008 | Tsukamoto et al. ......... | 714/807 |
| 2008/0320214 A1 | * | 12/2008 | Ma et al. ...................... | 711/103 |

(Continued)

FOREIGN PATENT DOCUMENTS

EP    2211281 A2    7/2010

OTHER PUBLICATIONS

International Search Report and Written Opinion received for International Application PCT/US2014/056216, mailed on Dec. 18, 2014.

*Primary Examiner* — Guerrier Merant  
(74) *Attorney, Agent, or Firm* — Thorpe North & Western, LLP (57) ABSTRACT

Apparatus, systems, and methods to manage high capacity memory devices are described. In one example, a controller comprises logic to receive a write operation comprising payload data, a namespace identifier (ID) and a first extended logical block address (LBA), compute a first system cyclic redundancy check (CRC) using a payload CRC, the namespace ID and the first extended LBA, store the first system CRC in association with the first extended LBA in a local memory, and write the payload data, the first system CRC, and a truncated LBA derived from the first extended LBA to a memory. Other examples are also disclosed and claimed.

18 Claims, 9 Drawing Sheets

(56) References Cited

U.S. PATENT DOCUMENTS

| | | |
|---|---|---|
| 2009/0172258 A1 | 7/2009 | Olbrich et al. |
| 2010/0023682 A1* | 1/2010 | Lee et al. ............ 711/103 |
| 2010/0318879 A1* | 12/2010 | Yu ............... 714/758 |
| 2011/0040924 A1* | 2/2011 | Selinger ............ 711/103 |
| 2011/0041037 A1 | 2/2011 | Frost et al. |
| 2012/0166715 A1* | 6/2012 | Frost et al. ............ 711/103 |

* cited by examiner

APPARATUS AND METHOD TO MANAGE HIGH CAPACITY STORAGE DEVICES

FIELD

The present disclosure generally relates to the field of electronics. More particularly, aspects generally relate to apparatus and methods to manage high capacity memory.

BACKGROUND

Solid state drive (SSD) memory devices provide high speed, nonvolatile memory capacity without the need for moving parts. SSD memory devices commonly comprise memory and a local controller, and may be coupled to a memory system of an electronic device. SSD technology is advancing rapidly, which will enable the introduction of high capacity SSD memory devices. Accordingly, techniques to manage high capacity memory devices may find utility, e.g., in memory systems for electronic devices.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Figure 1:
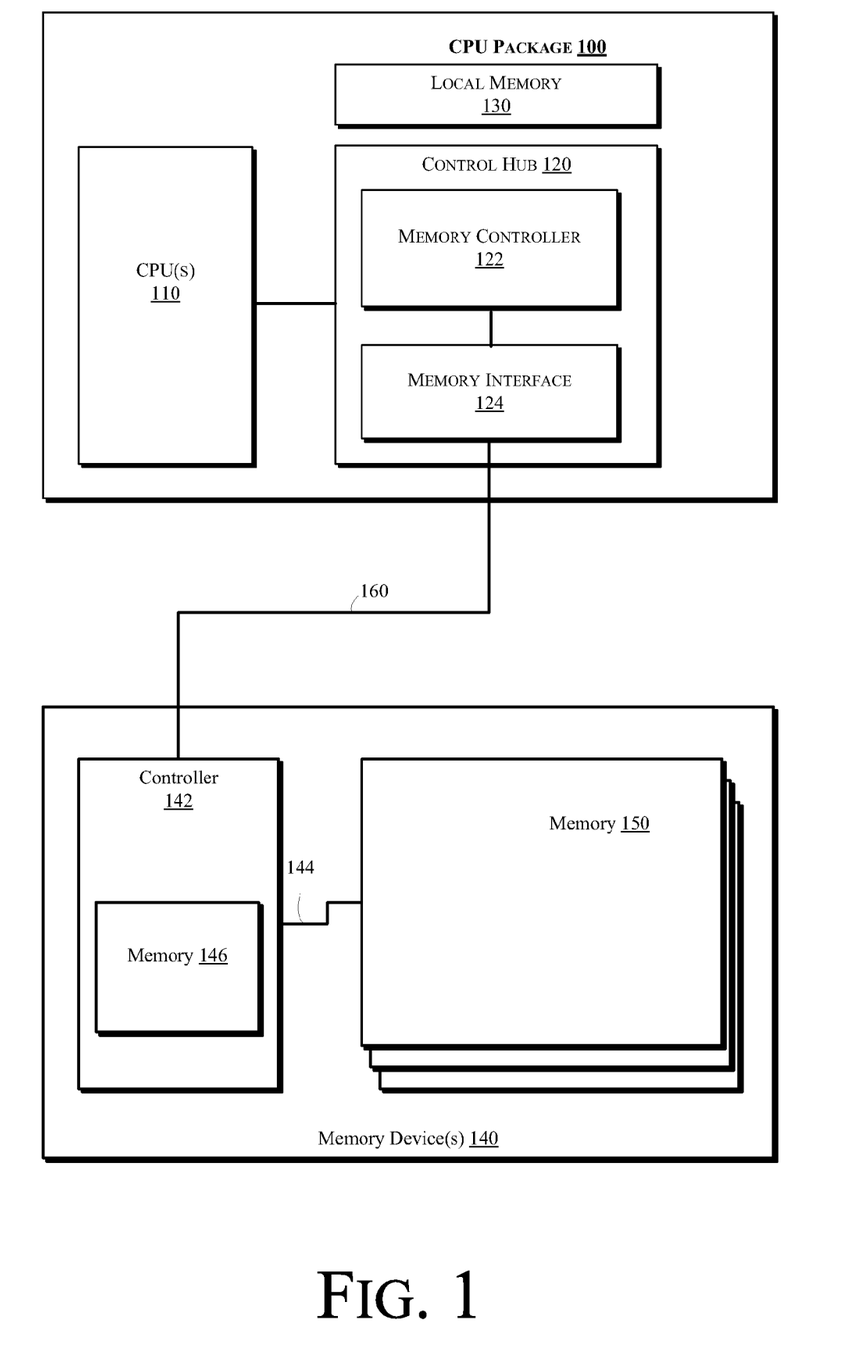
FIG. 1 is a schematic, block diagram illustration of components of an apparatus in which high capacity memory devices may be implemented in accordance with various examples discussed herein.

FIG. 1 is a schematic, block diagram illustration of components of an apparatus in which high capacity memory devices may be implemented in accordance with various examples discussed herein. Referring to FIG. 1, in some examples a central processing unit (CPU) package 100 which may comprise one or more CPUs 110 coupled to a control hub 120 and a local memory 130. Control hub 120 comprises a memory controller 122 and a memory interface 124. In some examples the control hub 120 may be integrated with the processor(s) 110.

Memory interface 124 is coupled to one or more remote memory devices 140 by a communication bus 160. Memory device 140 may comprise a controller 142 which may comprise local memory 146 and memory 150. In various examples, at least some of the memory 150 may be implemented using a solid state drive (SSD) comprising nonvolatile memory, e.g., phase change memory, NAND (flash) memory, ferroelectric random-access memory (FeTRAM), nanowire-based non-volatile memory, memory that incorporates memristor technology, a static random access memory (SRAM), three dimensional (3D) cross point memory such as phase change memory (PCM), spin-transfer torque memory (STT-RAM) or NAND memory. The specific configuration of the memory 150 in the memory device(s) 140 is not critical. In such embodiments the memory interface may comprise a Serial ATA interface, a PCI Express (PCIE) to 100 interface, or the like.

As described above, in some examples logic in the memory controller 122 manages write operations to memory device(s) 140 on behalf of applications which consume memory 150. More particularly, in some examples logic in the memory controller 122 receives memory access requests from applications executing on CPU(s) 110 and implements memory operations directed to memory devices 140.

In some examples described herein, the memory controller 142 comprising logic which allows the controller 142 to extend a 32-bit memory mapping scheme, ordinarily capable of mapping up to two terabytes (2 TB) of data stored in sectors that measure between 512 and 528 bytes, to map up to 8 terabytes (8 TB) of data, which requires a 35-bit mapping scheme. By cross-referencing a Logical Block Adress (LBA) of a sector referenced in a memory operation with a block address in an indirection table maintained by the controller 142, the controller 142 can reconstruct a 35-bit LBA from a 32-bit LBA. This allows the controller 142 to store a 32-bit LBA in the memory 150, thereby saving memory space for error correction control (ECC) bits or the like.

Figure 2A:
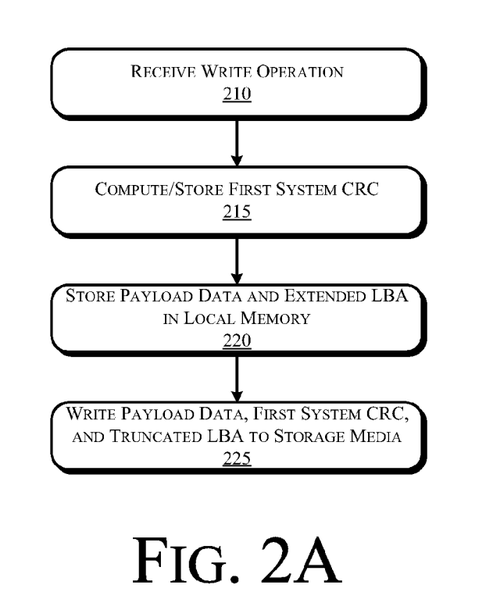
FIGS. 2A-2B is a flowchart illustrating operations in methods to manage high capacity memory devices in accordance with various examples discussed herein.

Operations implemented by controller 142 will be described with reference to FIGS. 2A-2B and 3-5. Referring first to FIG. 2A, at operation 210 the memory controller 142 receives data in a write operation. By way of example, in operation 210 memory controller 122 receives a request from a host, e.g., from an application executing on CPU 110 or another processor coupled to control hub 120, to write data to memory device(s) 140. The write request from memory controller 122 may identify a namespace and a logical block address (LBA) for the write operation and may include data, sometimes referred to as a payload, to be written to the memory device(s) 140. Memory controller 122 may comprise one or more mapping tables which translate logical block address (LBA) associated with the write operation received from the controller 122 to a physical address in the memory device(s) 140.

Figure 3:
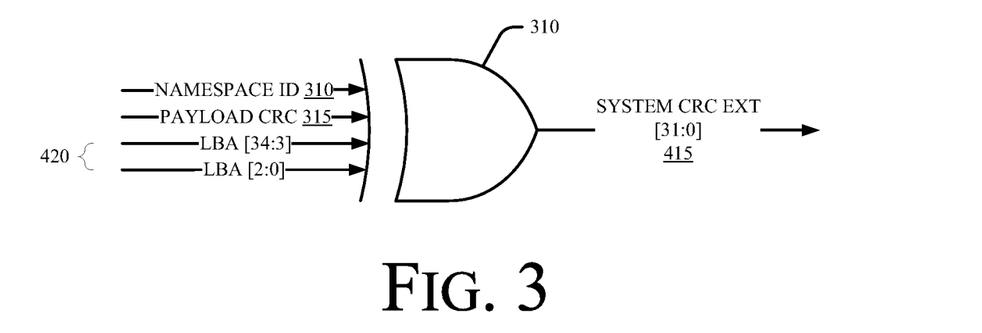
FIG. 3 is a schematic illustration of a cyclical redundancy check (CRC) calculation in a methods to manage high capacity memory devices in accordance with various examples discussed herein.

At operation 215 the controller 142 computes a first system cyclic redundancy check (CRC) 415 for the data received in the write operation. Referring to FIG. 3, in one example the first system CRC 415 is computed by applying an XOR operation to the namespace ID 310, the payload CRC 315, and the logical block address 420 received with the write operation. In some examples described herein the LBA may be a 35-bit LBA, which may be referred to herein as an extended LBA.

Figure 4A:
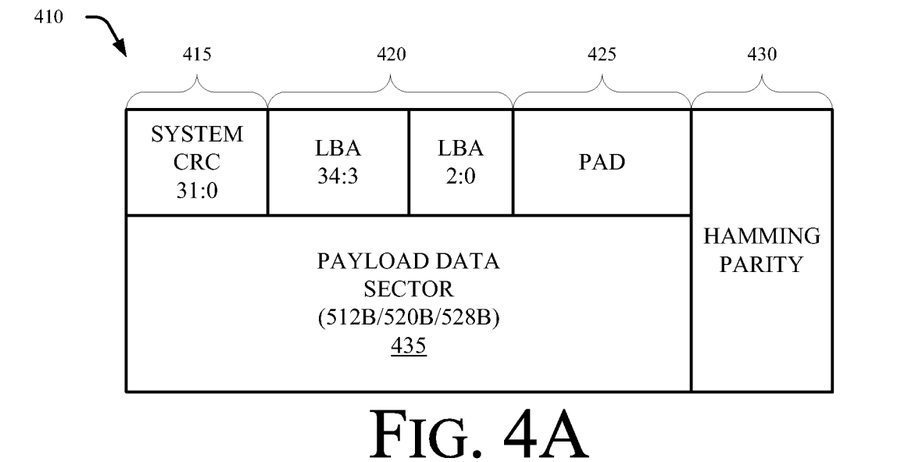
FIGS. 4A-4B and FIG. 5 are schematic illustrations of data storage structured in systems to manage high capacity memory devices in accordance with various examples discussed herein.

Referring to FIGS. 2A and 4A, at operation 220 the controller 142 stores the first system CRC 415, the extended LBA 420, and the payload data 435 in local memory 146. Controller 142 may also store a hamming parity code 430 with the data to local memory. Any remaining space may be padded, e.g., with zeros or ones.

Figure 4B:
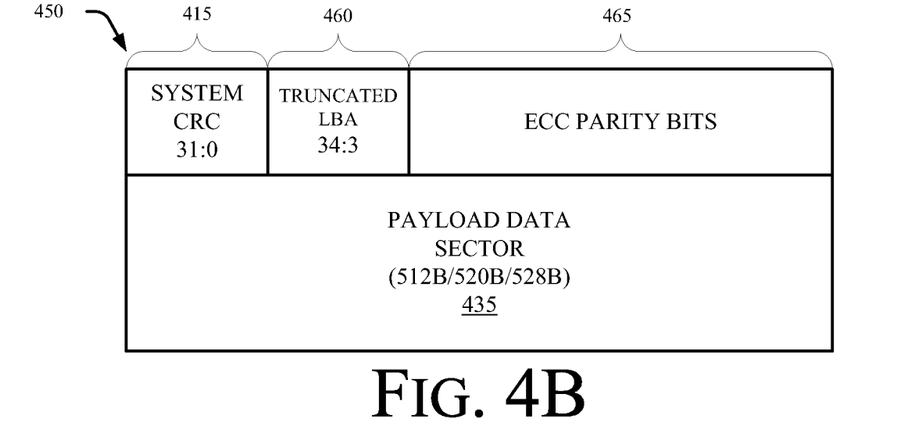

Referring now to FIGS. 2A and 4B, at operation 225 the controller 142 writes the first system CRC 415 and the payload data 435 to the memory 150 in memory device(s) 140. The controller 142 writes a truncated LBA 460 to the memory 150. In some examples, the controller 142 generates the truncated LBA 460 by dropping the three least significant bits (i.e., bits 2:0) from the extended LBA 420 stored on local memory 146. This provides three extra bits which may be filled with ECC parity bits 465 to enhance ECC capabilities, in the storage media.

Figure 2B:
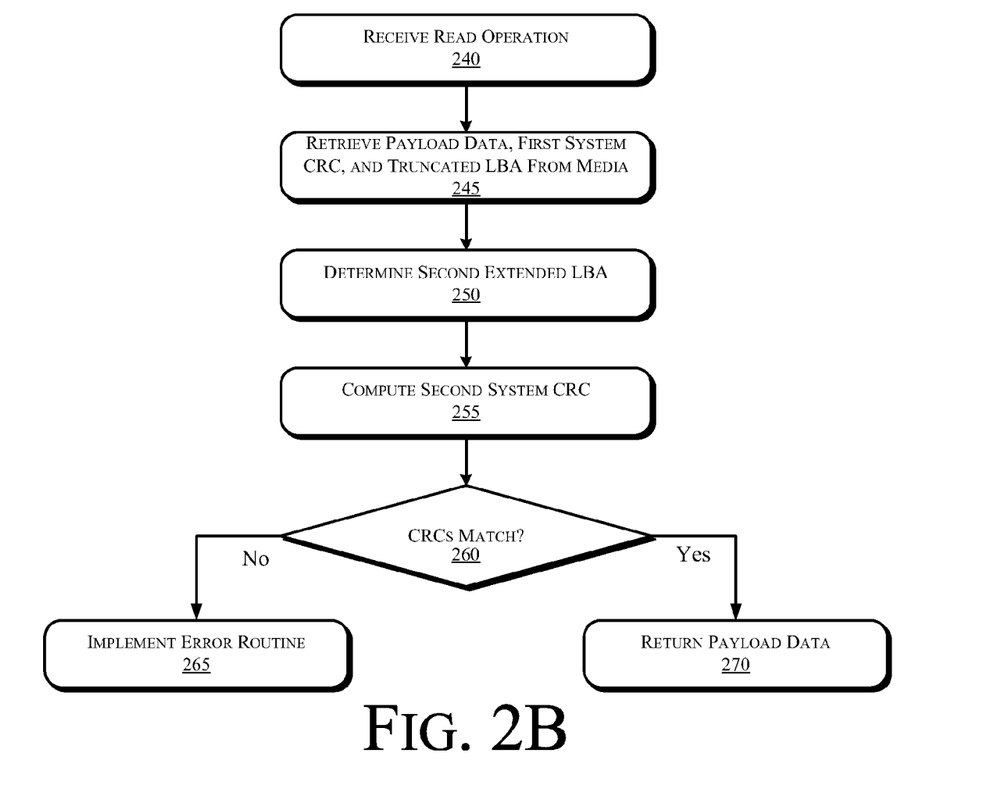

FIG. 2B presents operations implemented by the controller 142 in response to a read operation from memory controller 122. Referring to FIG. 2B, at operation 240 the controller 122 receives a read operation from memory controller 122. The read operation comprises an extended LBA 420 which identifies the logical block in which the requested data resides on the memory 150.

At operation 245 the controller 122 retrieves the payload data 435, the system CRC 415, and the truncated LBA 460 from the memory 150.

Figure 5:
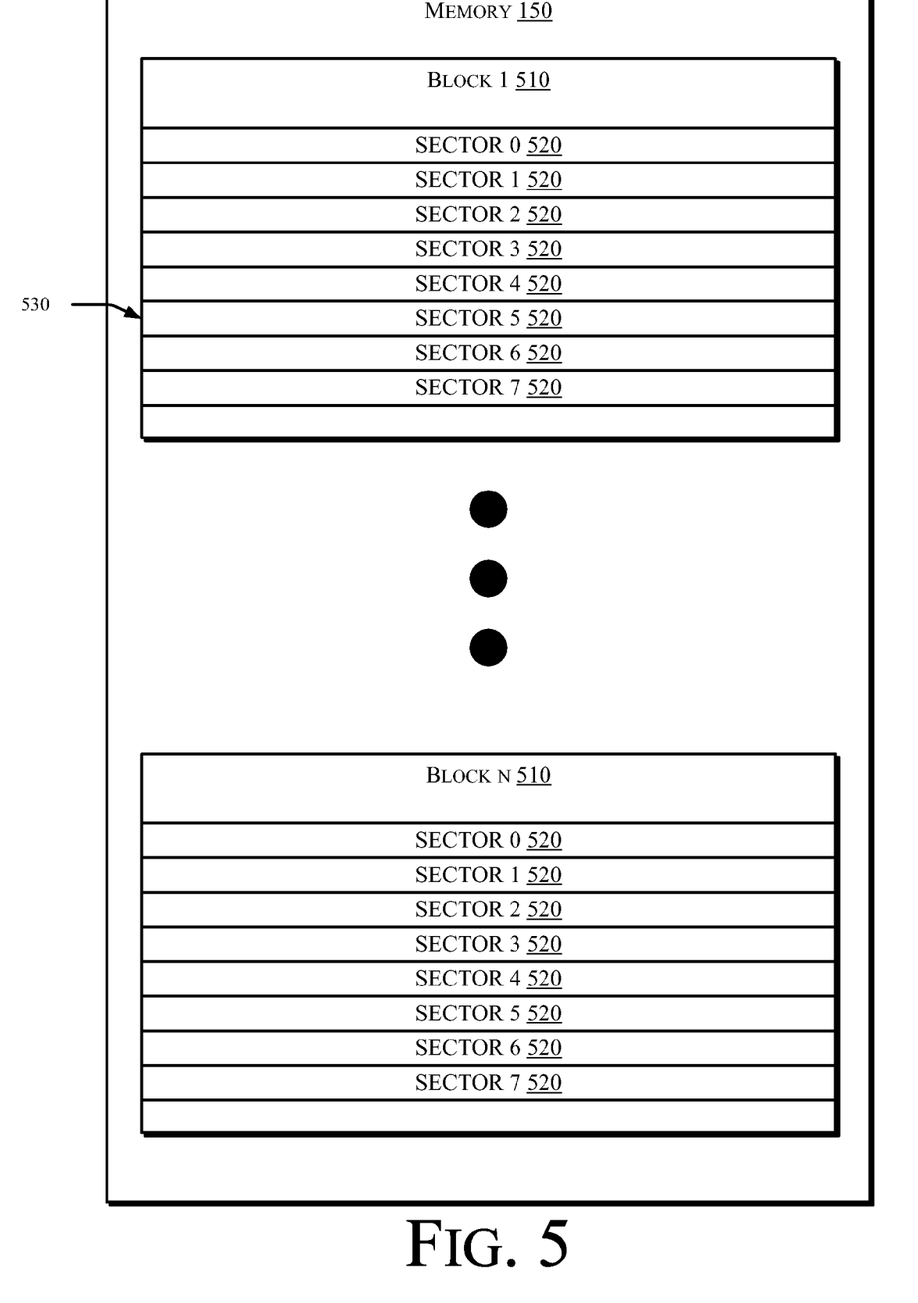

At operation 250 the controller 122 determines an extended LBA from the truncated LBA 460 retrieved from the memory 150. In one example the controller 122 determines the least three significant bits of the extended LBA by cross-referencing an indirection table maintained by the controller 122. FIG. 5 is a schematic illustration of a mapping of storage media an indirection table maintained by controller 122.

By way of an example, referring to FIG. 5, memory 150 may be mapped into logical blocks 510, each of which is dimensioned to hold eight (8) sectors and associated overhead data, as illustrated in FIG. 4B. The indirection table includes a pointer to the memory location of the beginning of each block 510. The controller 122 can use the LBA received with a read request to cross reference the indirection table to obtain the memory location of the beginning of the block 510 which includes the sector requested in the read operation. Then can count down the sectors to determine where the sector falls in the block and append the binary number corresponding to the number of the sector to the truncated LBA to form a second extended LBA.

For example, the indirection system may be configured with blocks 510 that are approximately 4K bytes in length such that each block 510 can hold eight sectors configured as depicted in FIG. 4B. If the controller 122 receives a read operation directed to the LBA identified by reference numeral 530, then the controller 122 can cross-reference the indirection table to obtain the location of the block 510, then can determine the sector number. In this example the LBA references sector 5 in the block 510 so the controller 122 will append a binary 5 (101) to the truncated LBA 460 retrieved from the memory 150 to form a second extended LBA.

Referring back to FIG. 2B, at operation 255 the controller 122 computes a second system cyclic redundancy check (CRC) value using a payload data 435, the namespace ID 315 and the second extended LBA determined in operation 250. For example, the second system CRC may be determined using the CRC function illustrated in FIG. 3A.

At operation 260 it is determined whether the second system CRC computed in operation 255 matches the first system CRC 415 retrieved with the data. If the second system CRC computed in operation 255 does not match the first system CRC 415 then control passes to operation 265 and the controller 122 implements an error routine. By way of example, controller 122 may return an error to memory controller 142. By contrast, if the second system CRC computed in operation 255 matches the first system CRC 415 then control passes to operation 270 and the controller 122 returns the payload data 435 read from the storage media.

Thus, the structure and operations described herein enable a controller 122 to manage a high capacity memory device. More particularly, the structure and operations described herein enable controller 122 to store a truncated LBA 460 in storage media and leverage information in an indirection table to convert the truncated LBA to an extended LBA which can be used in a CRC calculation.

Figure 6:
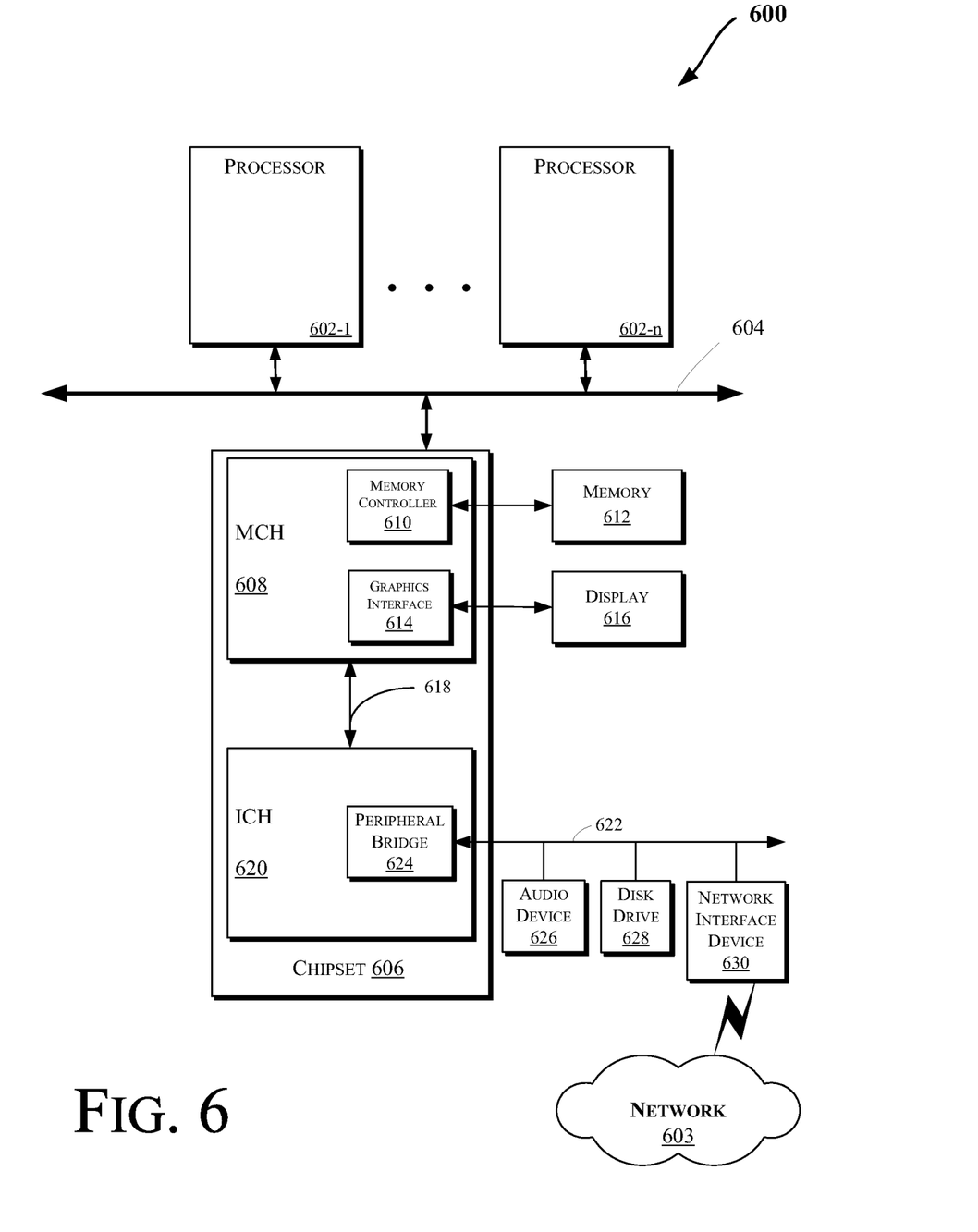
FIGS. 6-10 are schematic, block diagram illustrations of electronic devices which may be adapted to implement methods to reduce power delivery noise for partial writes in accordance with various examples discussed herein.

As described above, in some examples the electronic device may be embodied as a computer system. FIG. 6 illustrates a block diagram of a computing system 600 in accordance with an example. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
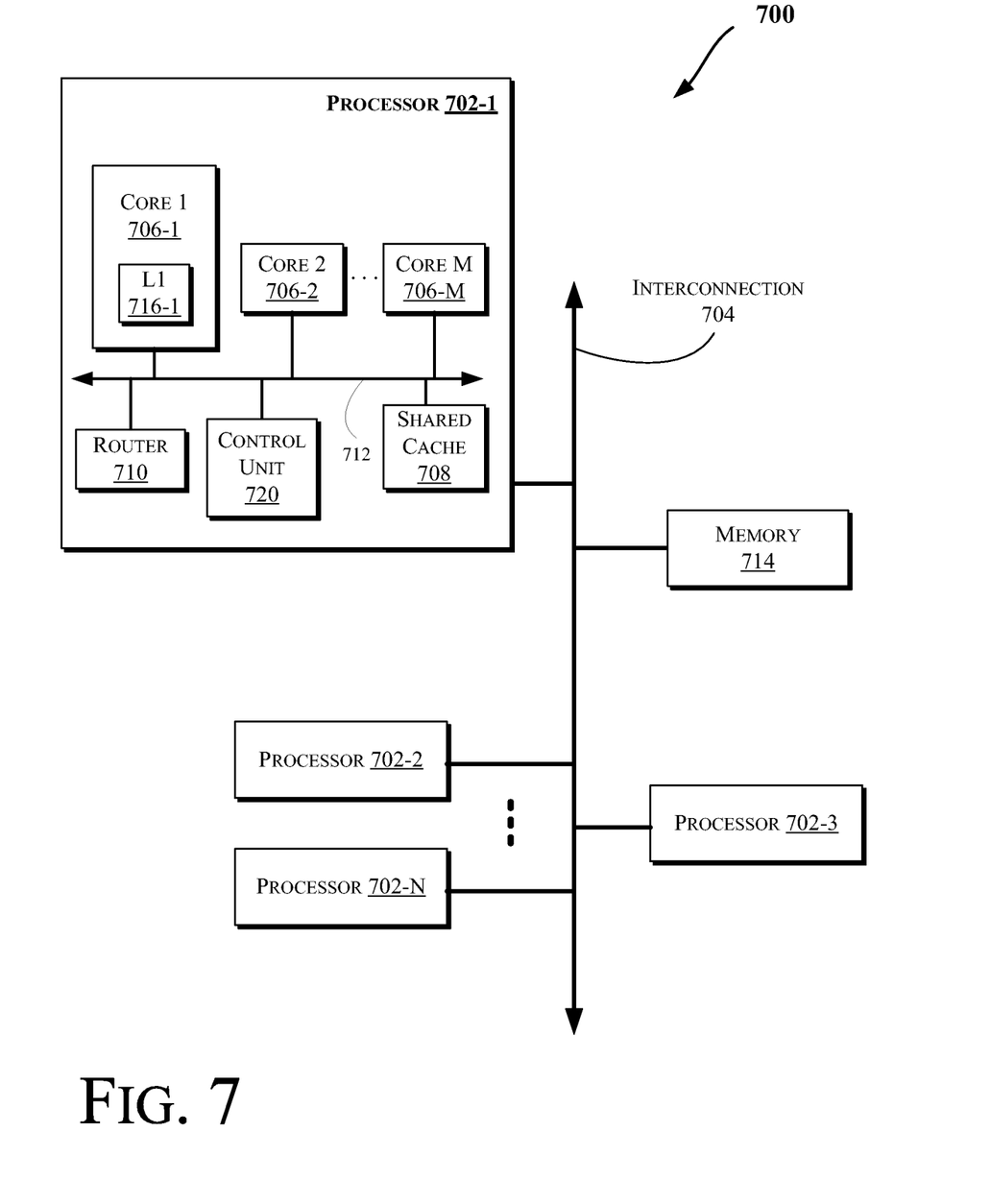

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to the memory controller 122 in FIG. 2.

Figure 8:
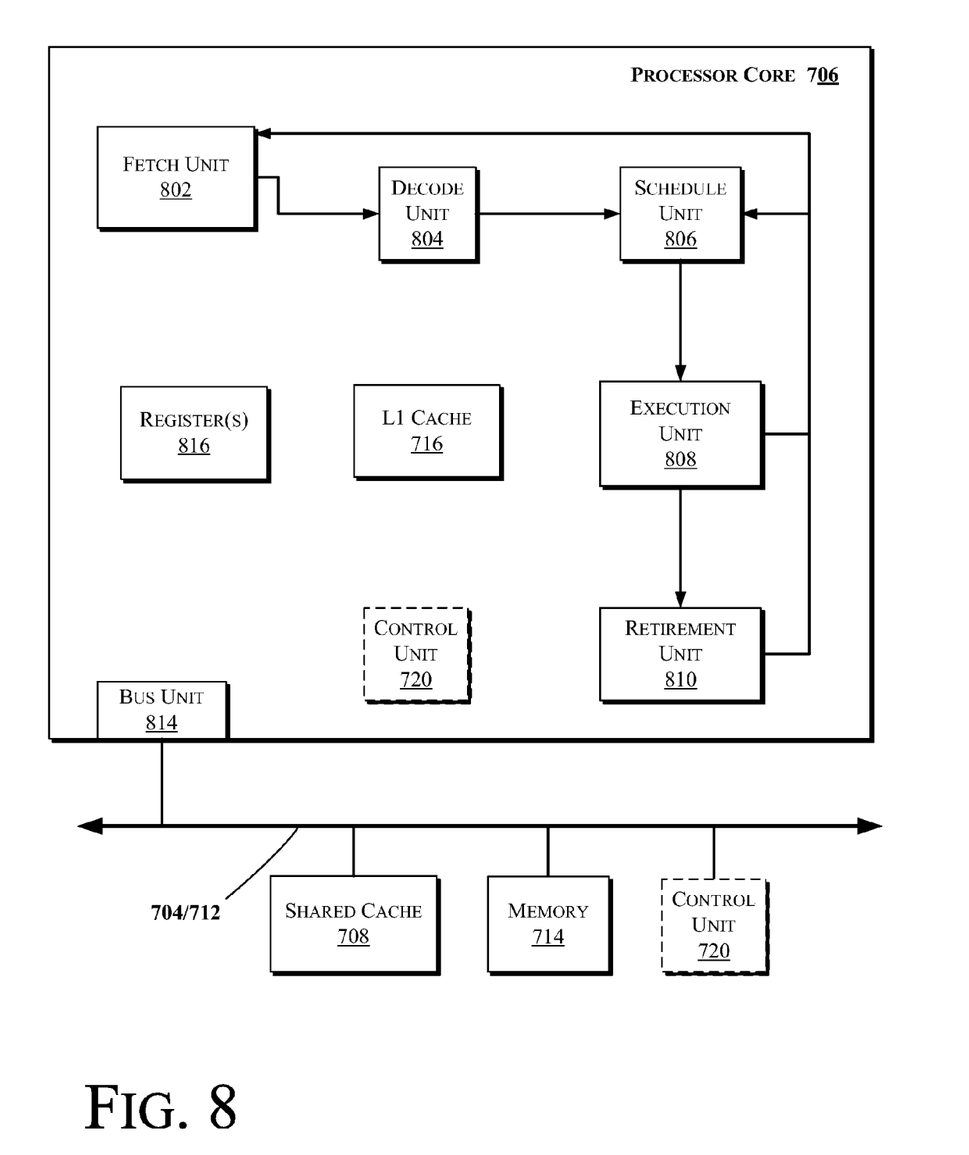

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
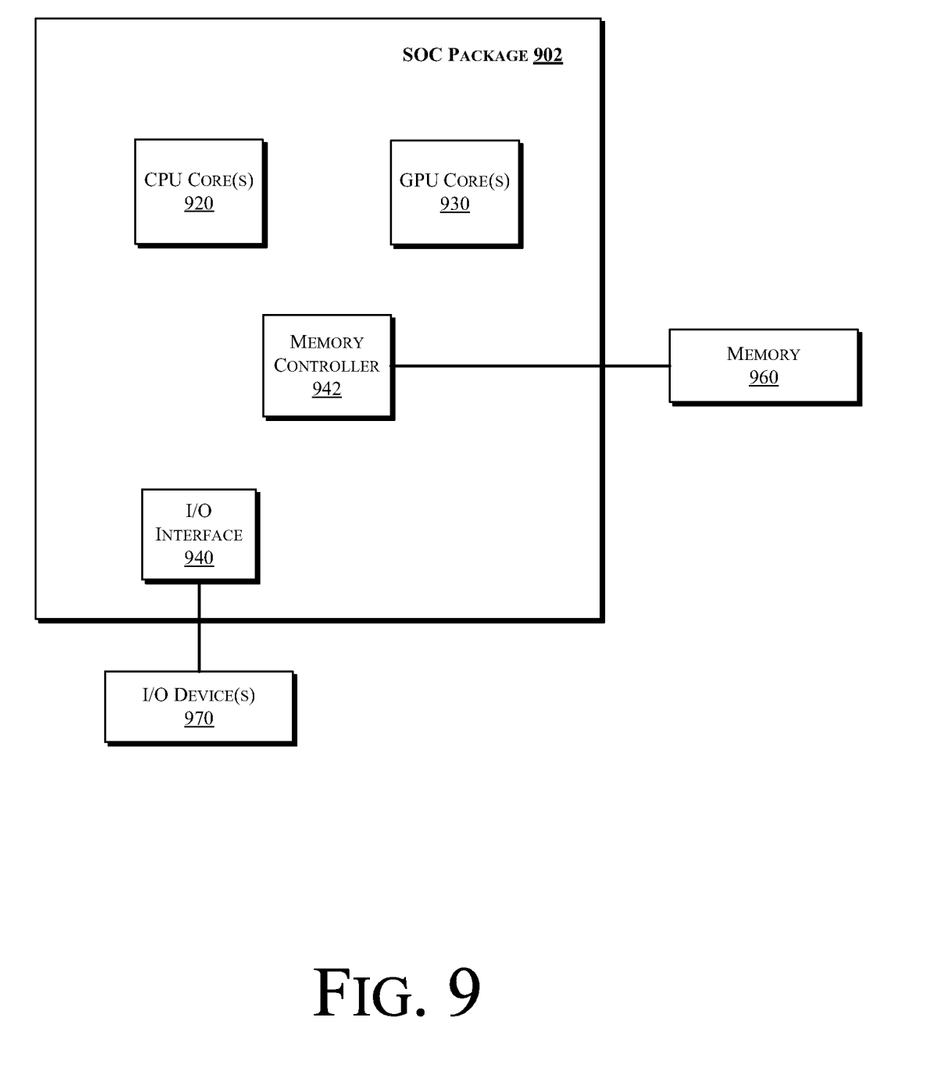

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
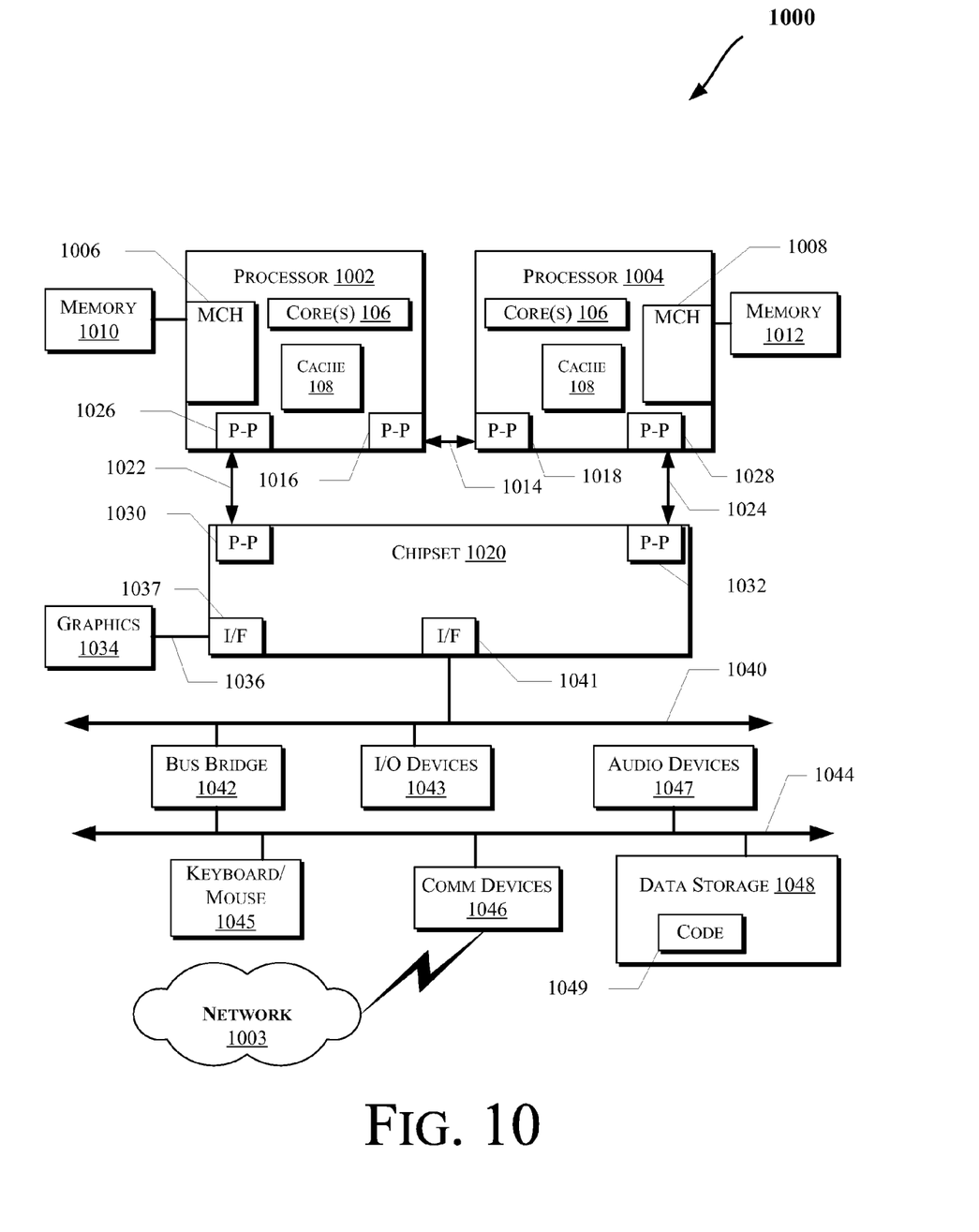

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1002 and 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a point-to-point PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 803), audio I/O device, and/or a data storage device 1048. The data storage device 1048 (which may be a hard disk drive or a NAND flash based solid state drive) may store code 1049 that may be executed by the processors 1002 and/or 1004.

The following examples pertain to further examples.

Example 1 is a controller comprising logic to receive a write operation comprising payload data, a namespace identifier (ID) and a first extended logical block address (LBA), compute a first system cyclic redundancy check (CRC) using a payload CRC, the namespace ID and the first extended LBA, store the first system CRC in association with the first extended LBA in a local memory, and write the payload data, the first system CRC, and a truncated LBA derived from the first extended LBA to a memory.

In Example 2, the subject matter of Example 1 can optionally include an arrangement in which the first extended LBA maps to a data sector on the memory, the memory is mapped into blocks which contain eight data sectors, and the truncated LBA written to the memory omits the three least significant bits of the first extended LBA.

In Example 3, the subject matter of any one of Examples 1-2 can optionally include an arrangement in which In Example 4, the subject matter of any one of Examples 1-3 can optionally include logic to receive a read operation comprising the first extended LBA, retrieve the payload data, the first system CRC, and the truncated LBA from the memory, and determine a second extended LBA from the truncated LBA.

In Example 5, the subject matter of any one of Examples 1-4 can optionally include logic to compute a second system cyclic redundancy check (CRC) value using the payload data, the namespace ID and the second extended LBA and implement an error routine when the second system CRC does not match the first system CRC.

In Example 6, the subject matter of any one of Examples 1-5 can optionally include logic to compute a second system cyclic redundancy check (CRC) value using a payload data, the namespace ID and the second extended LBA and return the payload data when the second system CRC matches the first system CRC.

Example 7 is an apparatus, comprising a non-volatile memory, and a controller coupled to the memory and comprising logic to receive a write operation comprising payload data, a namespace identifier (ID) and a first extended logical block address (LBA), compute a first system cyclic redundancy check (CRC) using a payload CRC, the namespace ID and the first extended LBA, store the first system CRC in association with the first extended LBA in a local memory, and write the payload data, the first system CRC, and a truncated LBA derived from the first extended LBA to a memory.

In Example 8, the subject matter of Example 7 can optionally include an arrangement in which the first extended LBA maps to a data sector on the memory, the memory is mapped into blocks which contain eight data sectors, and the truncated LBA written to the memory omits the three least significant bits of the first extended LBA.

In Example 9, the subject matter of any one of Examples 7-8 can optionally include an arrangement in which In Example 10, the subject matter of any one of Examples 7-9 can optionally include logic to receive a read operation comprising the first extended LBA, retrieve the payload data, the first system CRC, and the truncated LBA from the memory, and determine a second extended LBA from the truncated LBA.

In Example 11, the subject matter of any one of Examples 7-10 can optionally include logic to compute a second system cyclic redundancy check (CRC) value using the payload data, the namespace ID and the second extended LBA and implement an error routine when the second system CRC does not match the first system CRC.

In Example 12, the subject matter of any one of Examples 7-11 can optionally include logic to compute a second system cyclic redundancy check (CRC) value using a payload data, the namespace ID and the second extended LBA and return the payload data when the second system CRC matches the first system CRC.

Example 13 is an electronic device, comprising at least one processor, and at least one memory device comprising a memory, and a controller coupled to the memory and comprising logic to receive a write operation comprising payload data, a namespace identifier (ID) and a first extended logical block address (LBA). compute a first system cyclic redundancy check (CRC) using a payload CRC, the namespace ID and the first extended LBA, store the first system CRC in association with the first extended LBA in a local memory, and write the payload data, the first system CRC, and a truncated LBA derived from the first extended LBA to a memory.

In Example 14, the subject matter of Example 13 can optionally include an arrangement in which the first extended LBA maps to a data sector on the memory, the memory is mapped into blocks which contain eight data sectors, and the truncated LBA written to the memory omits the three least significant bits of the first extended LBA.

In Example 15, the subject matter of any one of Examples 13-14 can optionally include an arrangement in which In Example 16, the subject matter of any one of Examples 13-15 can optionally include logic to receive a read operation comprising the first extended LBA, retrieve the payload data, the first system CRC, and the truncated LBA from the memory, and determine a second extended LBA from the truncated LBA.

In Example 17, the subject matter of any one of Examples 13-16 can optionally include logic to compute a second system cyclic redundancy check (CRC) value using the payload data, the namespace ID and the second extended LBA and implement an error routine when the second system CRC does not match the first system CRC.

In Example 18, the subject matter of any one of Examples 13-17 can optionally include logic to compute a second system cyclic redundancy check (CRC) value using a payload data, the namespace ID and the second extended LBA and return the payload data when the second system CRC matches the first system CRC.

In various examples, the operations discussed herein, e.g., with reference to FIGS. 1-10, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A controller comprising logic to:
receive a write operation comprising payload data, a namespace identifier (ID) and a first extended logical block address (LBA);
compute a first system cyclic redundancy check (CRC) by applying an XOR operation to a payload CRC data, the namespace ID and the first extended LBA;
store the first system CRC in association with the first extended LBA in a first local memory;
generate a truncated LBA from the extended LBA by dropping one or more least significant bits from the extended LBA;
write the payload data, the first system CRC, and a truncated LBA derived from the first extended LBA to a second memory, separate from the first local memory; and
fill a memory space on the second memory for the one or more least significant bits with one or more ECC parity bits.

2. The controller of claim 1, wherein:
the first extended LBA maps to a data sector on the memory;
the memory is mapped into blocks which contain eight data sectors; and
the truncated LBA written to the memory omits the three least significant bits of the first extended LBA.

3. The controller of claim 2, wherein:
the first extended LBA maps to a data sector that measures between 512 bytes and 528 bytes; and
the memory is mapped into blocks that measure approximately 4 kilobytes.

4. The controller of claim 1, further comprising logic to
receive a read operation comprising the first extended LBA;
retrieve the payload data, the first system CRC, and the truncated LBA from the memory; and determine a second extended LBA from the truncated LBA.

5. The controller of claim 4, further comprising logic to:
compute a second system cyclic redundancy check (CRC) value using the payload data, the namespace ID and the second extended LBA; and
implement an error routine when the second system CRC does not match the first system CRC.

6. The controller of claim 4, further comprising logic to:
compute a second system cyclic redundancy check (CRC) value using a payload data, the namespace ID and the second extended LBA; and
return the payload data when the second system CRC matches the first system CRC.

7. An apparatus, comprising: a non-volatile memory; and a controller coupled to the memory and comprising logic to:
receive a write operation comprising payload data, a namespace identifier (ID) and a first extended logical block address (LBA);
compute a first system cyclic redundancy check (CRC) by applying an XOR operation to a payload CRC data, the namespace ID and the first extended LBA;
store the first system CRC in association with the first extended LBA in a local memory;
generate a truncated LBA from the extended LBA by dropping one or more least significant bits from the extended LBA;
write the payload data, the first system CRC, and a truncated LBA derived from the first extended LBA to a second memory, separate from the first local memory; and fill a memory space on the second memory for the one or more least significant bits with one or more ECC parity bits.

8. The apparatus of claim 7, wherein:
the first extended LBA maps to a data sector on the memory;
the memory is mapped into blocks which contain eight data sectors; and
the truncated LBA written to the memory omits the three least significant bits of the first extended LBA.

9. The apparatus of claim 8, wherein:
the first extended LBA maps to a data sector that measures between 512 bytes and 528 bytes; and
the memory is mapped into blocks that measure approximately 4 kilobytes.

10. The apparatus of claim 7, further comprising logic to
receive a read operation comprising the first extended LBA;
retrieve the payload data, the first system CRC, and the truncated LBA from the memory; and
determine a second extended LBA from the truncated LBA.

11. The apparatus of claim 10, further comprising logic to:
compute a second system cyclic redundancy check (CRC) value using the payload data, the namespace ID and the second extended LBA; and
implement an error routine when the second system CRC does not match the first system CRC.

12. The apparatus of claim 10, further comprising logic to:
compute a second system cyclic redundancy check (CRC) value using a payload data, the namespace ID and the second extended LBA; and
return the payload data when the second system CRC matches the first system CRC.

13. An electronic device, comprising:
at least one processor; and
at least one memory device comprising a memory; and
a controller coupled to the memory and comprising logic to:
receive a write operation comprising payload data, a namespace identifier (ID) and a first extended logical block address (LBA);
compute a first system cyclic redundancy check (CRC) by applying an XOR operation to a payload CRC data, the namespace ID and the first extended LBA;
store the first system CRC in association with the first extended LBA in a local memory;
generate a truncated LBA from the extended LBA by dropping one or more least significant bits from the extended LBA;
write the payload data, the first system CRC, and a truncated LBA derived from the first extended LBA to a second memory, separate from the first local memory; and
fill a memory space on the second memory for the one or more least significant bits with one or more ECC parity bits.

14. The electronic device of claim 13, wherein:
the first extended LBA maps to a data sector on the memory;
the memory is mapped into blocks which contain eight data sectors; and
the truncated LBA written to the memory omits the three least significant bits of the first extended LBA.

15. The electronic device of claim 14, wherein:
the first extended LBA maps to a data sector that measures between 512 bytes and 528 bytes; and
the memory is mapped into blocks that measure approximately 4 kilobytes.

16. The electronic device of claim 13, further comprising logic to
receive a read operation comprising the first extended LBA;
retrieve the payload data, the first system CRC, and the truncated LBA from the memory; and
determine a second extended LBA from the truncated LBA.

17. The electronic device of claim 16, further comprising logic to:
compute a second system cyclic redundancy check (CRC) value using the payload data, the namespace ID and the second extended LBA; and
implement an error routine when the second system CRC does not match the first system CRC.

18. The electronic device of claim 16, further comprising logic to:
compute a second system cyclic redundancy check (CRC) value using a payload data, the namespace ID and the second extended LBA; and
return the payload data when the second system CRC matches the first system CRC.

* * * * *